(12) United States Patent
Christensen et al.

(10) Patent No.: US 10,268,873 B2
(45) Date of Patent: Apr. 23, 2019

(54) METHOD AND FINGERPRINT SENSING SYSTEM FOR ANALYZING BIOMETRIC MEASUREMENTS OF A USER

(71) Applicant: Fingerprint Cards AB, Göteborg (SE)

(72) Inventors: Søren Skovgaard Christensen, Dyssegaard (DK); Mikkel Stegmann, Vanløse (DK); Lars Christensen, Charlottenlund (DK); Michael Sass Hansen, Søborg (DK)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/418,874

(22) Filed: Jan. 30, 2017

(65) Prior Publication Data
US 2017/0220845 A1    Aug. 3, 2017

(30) Foreign Application Priority Data

Feb. 2, 2016  (SE) ...................................... 1650126

(51) Int. Cl.
| G06K 9/00 | (2006.01) |
| G06K 9/32 | (2006.01) |
| G06K 9/62 | (2006.01) |
| G06F 21/32 | (2013.01) |

(52) U.S. Cl.
CPC ....... *G06K 9/00067* (2013.01); *G06K 9/0002* (2013.01); *G06K 9/00033* (2013.01); *G06K 9/00087* (2013.01); *G06K 9/3208* (2013.01); *G06K 9/6215* (2013.01); *G06F 21/32* (2013.01)

(58) Field of Classification Search
None
See application file for complete search history.

(56) References Cited

U.S. PATENT DOCUMENTS

| 6,535,622 | B1 | 3/2003 | Russo et al. | |
| 8,631,243 | B2 | 1/2014 | Baldan et al. | |
| 2001/0040987 | A1 | 11/2001 | Bjorn et al. | |
| 2003/0002718 | A1* | 1/2003 | Hamid | G06K 9/0002 382/124 |
| 2003/0044052 | A1* | 3/2003 | Martin | G06K 9/00093 382/125 |
| 2003/0169910 | A1* | 9/2003 | Reisman | G06K 9/00087 382/124 |
| 2004/0199775 | A1* | 10/2004 | Ser | G06K 9/00067 713/186 |
| 2005/0018899 | A1* | 1/2005 | Elyasaf | G01N 21/8851 382/145 |

(Continued)

FOREIGN PATENT DOCUMENTS

GB          2507540 A      5/2014

OTHER PUBLICATIONS

PCT International Search Report and Written Opinion dated Apr. 20, 2017 for PCT International Application No. PCT/SE2017/050069, 12 pages.

*Primary Examiner* — Ryan P Potts
(74) *Attorney, Agent, or Firm* — RMCK Law Group, PLC

(57) ABSTRACT

The present invention generally relates to a method for analyzing biometric measurements of a user, and specifically to determination of an alignment level between features of different biometric measurements acquired using a biometric sensor. The invention also relates to a corresponding fingerprint sensing system and to a computer program product.

19 Claims, 3 Drawing Sheets

(56) References Cited

U.S. PATENT DOCUMENTS

| | | | |
|---|---|---|---|
| 2008/0298646 A1* | 12/2008 | Wennergren | G06K 9/00087 |
| | | | 382/124 |
| 2010/0080425 A1* | 4/2010 | Bebis | G06K 9/00073 |
| | | | 382/125 |
| 2013/0173925 A1* | 7/2013 | Yen | G06F 21/32 |
| | | | 713/186 |
| 2014/0267659 A1 | 9/2014 | Lyon et al. | |
| 2014/0286546 A1 | 9/2014 | Shin et al. | |
| 2015/0110367 A1* | 4/2015 | Kumar | G06K 9/00087 |
| | | | 382/124 |
| 2016/0042219 A1* | 2/2016 | Bae | G06K 9/00013 |
| | | | 382/124 |

* cited by examiner

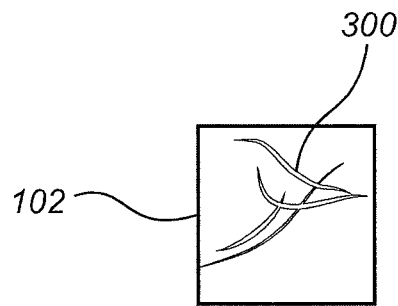
Fig. 3a
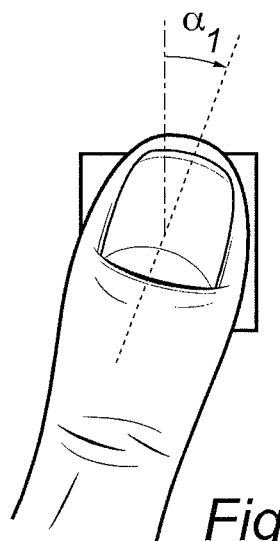 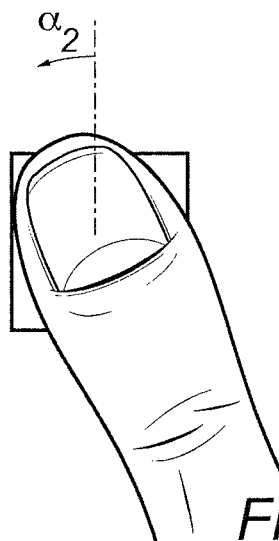
Fig. 3b      Fig. 3d
 
Fig. 3c      Fig. 3e
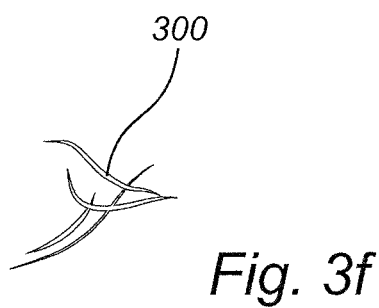
Fig. 3f

METHOD AND FINGERPRINT SENSING SYSTEM FOR ANALYZING BIOMETRIC MEASUREMENTS OF A USER

CROSS-REFERENCE TO RELATED APPLICATION

The present application is based on and claims the benefit of Swedish patent application Serial No. 1650126-4, filed Feb. 2, 2016, the content of which is hereby incorporated by reference in its entirety.

TECHNICAL FIELD

The present invention generally relates to a method for analyzing biometric measurements of a user, and specifically to determination of an alignment level between features of different biometric measurements acquired using a biometric sensor. The invention also relates to a fingerprint sensing system comprising a biometric sensor in the firm of a fingerprint sensor and to a corresponding computer program product.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns the presence of fixed patterns, resulting from the manufacturing of the fingerprint sensor or formed during use of the sensor, including for example scratches, etc. Such fixed patterns effectively result in degraded biometric performance.

A special case is when fixed patterns are introduced after the enrollment phase and after the security level of the system has been determined. Due to the need to accommodate ageing of biometric traits, the fingerprint template will likely have to be updated over time. This leaves the system vulnerable to a fixed pattern being introduced into the biometric fingerprint template.

In consequence, a lower than expected security level will result, since the matching process may recognize fixed pattern components in imposter attempts, thereby leading to a higher than expected false accept rate. Even without progressive updating of the fingerprint template, a fixed pattern may enter the template if the (genuine) user chooses to re-enroll. This re-enrollment may for example be triggered as a result of poor biometric performance due to the reduced similarity between the template and the identification samples, as the latter group now contains a fixed pattern in addition to fingerprint data.

SUMMARY OF THE INVENTION

In view of above-mentioned problems with fixed patterns, it is an object of the present invention to provide an improved method for mitigating fixed patterns in biometric systems. In particular, the present inventors have found that it may be possible to take into account the alignment of features when comparing biometric measurements of a user, making use of an alignment level for identifying possible fixed patterns.

According to an aspect of the present invention, it is therefore provided a method for analyzing biometric measurements of a user by means of a biometric sensing system comprising a biometric sensor and processing circuitry connected to the biometric sensor, wherein the method comprises the steps of determining a first set of features from a first biometric measurement of the user, the biometric measurement acquired using the biometric sensor, each feature of the first set of features having a location provided in relation to the biometric sensor, measuring alignment differences between the locations of the first set of features and corresponding features of a second set of features, and identifying a sub-set of the first set of features having an alignment difference being less than a given alignment threshold.

The principal idea behind the invention resides in the unlikely scenario that a e.g. a body, face, hand, etc. of a user will be completely aligned in relation to e.g. a coordinate system of a biometric sensor when comparing subsequently acquired biometric measurements of the user, where the biometric measurements are acquired by means of the biometric sensor. In contrast, any fixed pattern will be well aligned across measurements. In accordance to the invention, features that are determined to "align too well" are identified as possible candidates relating to a fixed pattern at or adjacently to a surface the biometric sensor. It is worth noting that also the second set of features are arranged to have a location provided in relation to the biometric sensor.

Rather than applying the prior art approach of discarding a full biometric measurement of the user in case only a small difference between subsequently acquired biometric measurements, the present invention goes further by allowing for a selection process to be implemented where only a sub-set of features identified as having an alignment difference being less than a threshold for example may be discarded from further use. Such a solution for example improves the usability of a system implementing the inventive concept as more information may be used at each e.g. image acquisition. In addition, the security may be improvised by in fact allowing a user template to be dynamically updated during continuous use of the biometric sensing system.

The removal of the sub-set of features may be applied to either or both of features relating to a currently acquired biometric measurement of a user (e.g. the first set of features) and to features relating to a further or previously acquired biometric measurement of the user (e.g. the second set of features). Accordingly, any set of features may be "purified" from possible fixed patterns.

By means of the inventive concept it will be possible to reduce the number of false accepts (of imposters) caused by fixed pattern features. It will also be possible to preserve a low false rejection rate (of genuines) in a system applying the inventive concept without fixed patterns, i.e. by not degrade the basic identification performance as a result of fixed pattern protection. Furthermore, it will in accordance to the invention be possible to keep the false rejection rate (of genuines) low in a system contaminated with fixed patterns.

In a possible embodiment each feature of the first set of features further has an orientation provided in relation to the biometric sensor. That is, further information may be provided in relation to the features and used in measuring alignment differences, e.g. including how the feature is rotated in relation to the mentioned coordinate system of the biometric sensor.

Furthermore, the identified alignment differences are tagged to the first set of features. Accordingly, rather than directly performing a process of removing e.g. the sub-set of the first set of features, the actual identified alignment differences may be stored for later use, e.g. in an authentication process.

In accordance to the present disclosure, it should be understood that the matching threshold may be previously determined and/or set dynamically during operation of the biometric sensing system. For example, it may be possible to successively increase the matching threshold during use of the biometric sensing system, based on the expectation that an increased amount of fixed pattern could be present in relation to the surface of the biometric sensor. The matching threshold could in a possible embodiment be set differently depending on if the features are to be "appended" to a previously determined template for the user ("template update") or if the features are used in an authentication process. That is, the matching threshold may for example be set to be more secure in case of template update as compared to when performing the authentication process.

Preferably, the biometric system is further configured for allowing the authentication of the user. In such an implementation the method may further include the general determination of a matching level between the first set of features and the second set of features and comparing the matching level and a matching threshold, where the matching threshold may be dependent on the measuring alignment differences.

In a possible embodiment, the biometric sensing system is a vision system and the biometric sensor is a camera. Accordingly, the camera may be configured to capture images of the user to be used as an input for determining the sets of features. Such a biometric vision system may for example be used for user identification/authentication. The fixed pattern may as such be introduced e.g. at a lens or adjacently to the sensor. The camera could for example be a CCD or a CMOS based camera.

Preferably, the biometric sensing system is a fingerprint sensing system and the biometric sensor is a fingerprint sensor, where the fingerprint sensor is configured to acquire a fingerprint image of the user. The second set of features may in such a case relate to a previously determined fingerprint template for the user, and the first set of features is determined based on e.g. a presently acquired fingerprint image.

Within the context of the present disclosure, the expression "fingerprint image" should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining the sets of features.

According to another aspect of the present invention, there is provided a fingerprint sensing system, comprising a fingerprint sensor, a memory, and processing circuitry connected to the fingerprint sensor for acquiring a first fingerprint image using the fingerprint sensor, determining a first set of features from the first fingerprint image, each feature of the first set of features having a location provided in relation to the fingerprint sensor, measuring alignment differences between the locations of the first set of features and corresponding features of a second set of features, and identifying a sub-set of the first set of features having an alignment difference being less than a threshold. This aspect of the invention provides similar advantages as discussed above in relation to the previous aspect of the invention. The expression "processing circuitry" should be understood to include any type of computing device, such as an ASIC, a micro-processor, etc. It should also be understood that the actual implementation of such a processing circuitry may be divided between more than a single device/circuit.

The fingerprint sensor may, as indicated above, be implemented using any kind of current or future fingerprint sensing principle, including for example capacitive, optical, or thermal sensing technology. However, at present capacitive sensing is most preferred. Both one and two-dimensional sensors are possible and within the scope of the invention.

The fingerprint sensing system preferably forms part of an electronic device further comprising a device controller for performing an authentication of the finger based on the at least one selected fingerprint image, and performing at least one action only if the authentication indicates an authentication success. Such an action may for example be for unlocking a locked portable device, e.g. in case the portable device is a mobile phone. The at least one action may of course be any type of action suitably used when there is a need to authenticate a finger.

According to a further aspect of the present invention, there is provided a computer program product comprising a computer readable medium having stored thereon computer program means for controlling an electronic device, the electronic device comprising a biometric sensing system comprising a biometric sensor and processing circuitry connected to the biometric sensor, wherein the computer program product comprises code for determining a first set of features from a first biometric measurement of the user, the biometric measurement acquired using the biometric sensor, each feature of the first set of features having a location provided in relation to the biometric sensor, code for measuring alignment differences between the locations of the first set of features and corresponding features of a second set of features, and code for identifying a sub-set of the first set of features having an alignment difference being less than a threshold. Also this aspect of the invention provides similar advantages as discussed above in relation to the previous aspects of the invention.

In summary, the present invention generally relates to a method for analyzing biometric measurements of a user, and specifically to determination of an alignment level between features of different biometric measurements acquired using a biometric sensor. Advantages of the invention include the possibility of purifying sets of features contaminated with fixed patterns present at or adjacently to the biometric sensor.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIGS. 3a-3f show a conceptual flow of acquiring and purifying a fingerprint from a fixed pattern;

DETAILED DESCRIPTION

Figure 1:
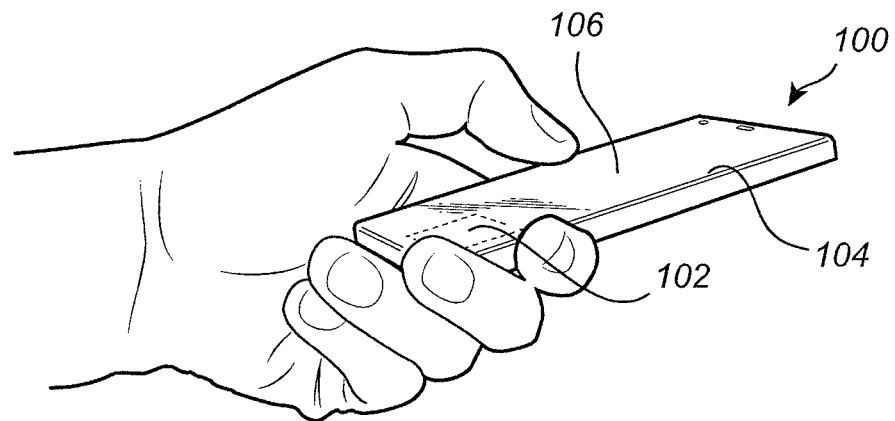
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
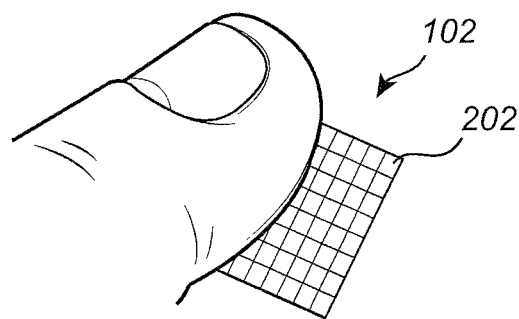
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202. It should be understood that the invention may be applied to other types of sensors, for example provided in relation to vision system. In such a case a camera is typically included where e.g. a surface of a substrate/lens provided with the camera at a location facing e.g. a user/object may be provided with a fixed pattern. The camera may be arranged to capture e.g. a face or body part of a user to be subsequently used for identifying/authenticating the user.

Figure 5:
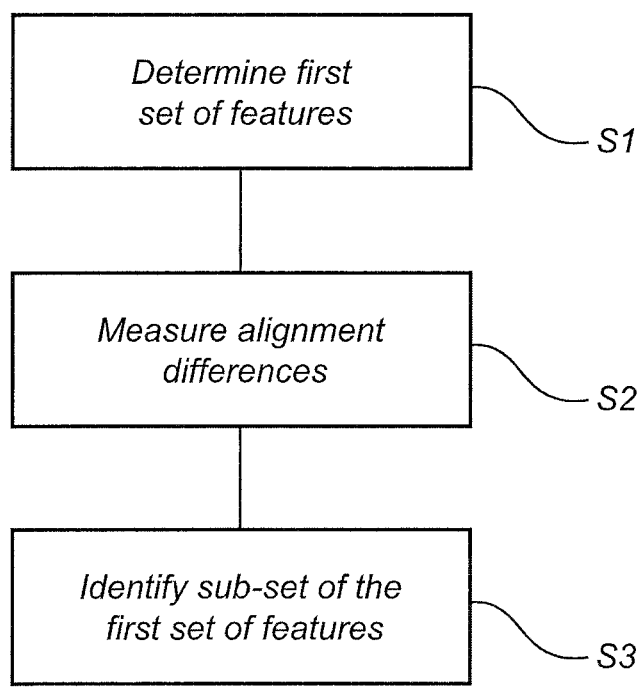
FIG. 5 is a flowchart disclosing the exemplary steps of the invention typically performed in conjunction with the fingerprint sensing system of FIG. 4.

Turning to FIGS. 3a-3f in combination with FIG. 5, there is conceptually illustrated a possible implementation of the invention. The basic idea of the invention is to utilize the geometric alignment information between e.g. a fingerprint template for a user and a fingerprint sample used for identification/authentication of the user to assist in filtering out the fixed pattern in the pattern recognition process. Since a fixed pattern imposed onto e.g. the fingerprint sensor 102 will have fixed alignment to a reference coordinate system of the fingerprint sensor 102, whereas the fingerprint sample of interest generally will not, this property can be exploited to help separate what is fingerprint sample data of interest and what is not.

Specifically, in FIG. 3a there is illustrated an example of a "top surface" (e.g. coating) of a fingerprint sensor 102. A plurality of scratches 300 has been introduced at the top surface during normal use of the fingerprint sensor 102, e.g. when the portable electronic device comprising the fingerprint sensor 102 has been placed in a pocket/bag of the user. It should be understood that the fixed pattern, e.g. scratches 300, possibly could be deliberately introduced or inherent from the manufacturing of the fingerprint sensor 102.

When activating the fingerprint sensor 102 for acquiring a fingerprint image, as seen in FIG. 3b, the user will position his finger at or adjacently to the top surface of the fingerprint sensor 102 at a first random relative angle $\alpha_1$ as compared to the fingerprint sensor 102. The scratches 300 will accordingly be captured by the fingerprint sensor 102 along with friction ridges of the finger, the friction ridges of the finger representing the "real" fingerprint for the user. The digital representation of the friction ridges of the finger of the user at the first random relative angle $\alpha_1$ combined with the scratches 300 at the surface of the sensor 102 are shown in FIG. 3c as a first distorted fingerprint image 302. In a prior art solution, the distorted fingerprint image 302 will form an input for all subsequent image analysis, feature extraction, authentication, etc. Accordingly, also the scratches will be taken as being part of the users fingerprint. However, in accordance to the invention, a first set of features being a representation of and determined, S1, from the distorted fingerprint image 302 are compared to a second set of features. It should be understood that each feature of the first set of features are defined to have a location and possibly a rotation provided in relation to the fingerprint sensor 102. The second set of features may for example be determined from a second fingerprint image, or be part of e.g. a previously determined fingerprint template for the user.

In the illustration provided in FIG. 3d, the second set of features are formed by the user again, e.g. at a later stage, positioning his finger at the fingerprint sensor 102 at a second random relative angle $\alpha_2$ as compared to the fingerprint sensor 102. In FIG. 3d the finger is slightly rotated as compared to the finger shown in FIG. 3b. In accordance to the invention, the first relative angle $\alpha_1$ and the second relative angle $\alpha_2$ are during normal use not expected to be the same, i.e. at least a small amount of misalignment is expected between the different times of the user positioning his finger at the fingerprint sensor 102. In comparing FIGS. 3*b* and 3*d* only a small rotation is illustrated, a small translation of the position of the finger of the user is of course possible/likely. The digital representation of the friction ridges of the finger of the user at the second random relative angle $\alpha_2$ combined with the scratches 300 at the surface of the sensor 102 are shown in FIG. 3*e* as a second distorted fingerprint image 304.

By means of the invention, alignment differences are measured, S2, the measurements made between the locations of the first set of features and the features of the second set of features. As is understood from the above, the features of the first and the second set of features relating to the scratches will have essentially (or identically) the same location (and possibly rotation) as compared to e.g. the reference coordinate system of the fingerprint sensor 102.

In the illustration provided in FIG. 3*f,* the first set of features relating to the first distorted fingerprint image 302 have been compared to the second set of features relating to the second distorted fingerprint image 304. In accordance to the invention, a sub-set of features having alignment differences being "too small", being smaller than a threshold, are extracted out and identified, S3, as possibly being part of the fixed pattern, e.g. conceptually illustrated as the scratches 300, at the surface of the fingerprint sensor 102.

The identified sub-set of features may for example be filtered out from the first 302 and/or the second 304 distorted fingerprint images, thus forming a purified fingerprint image. The information may alternatively be used within a matching process, possibly allowing for a higher matching threshold if an in comparison large amount of fixed pattern has been identified.

In a possible embodiment of the invention, it may be of interest to allow for a fingerprint template for the user to be "continuously" updated during use, for allowing small changes to the fingerprint of the user to be accounted for. It is undesirable to introduce a fixed pattern with such an updated fingerprint template. Thus, it may in accordance to the invention be possible to check that a given feature from a first fingerprint image can be found in another fingerprint image with a non-identity transform (i.e. "enough misalignment"), before the feature is allowed to be admitted into the template. This constraint to template updating should also allow for an improved safety of a system comprising the disclosed solution as e.g. an intentionally introduced fixed pattern (e.g. by a potential imposter) will be identified and accordingly not allowed to be introduced with any updated fingerprint templates.

In the above presentation of the invention it is stated that the identification of the possible fixed pattern is done when the alignment difference is less than a threshold. The threshold could be predetermined or be continuously updated. The threshold could also be dependent on if it previously has been determined that a fixed pattern is present at the fingerprint sensor 102. The threshold may also in some implementations be allowed to be set by the user, e.g. for improved security/safety of the system comprising the fingerprint sensor 102.

Figure 4:
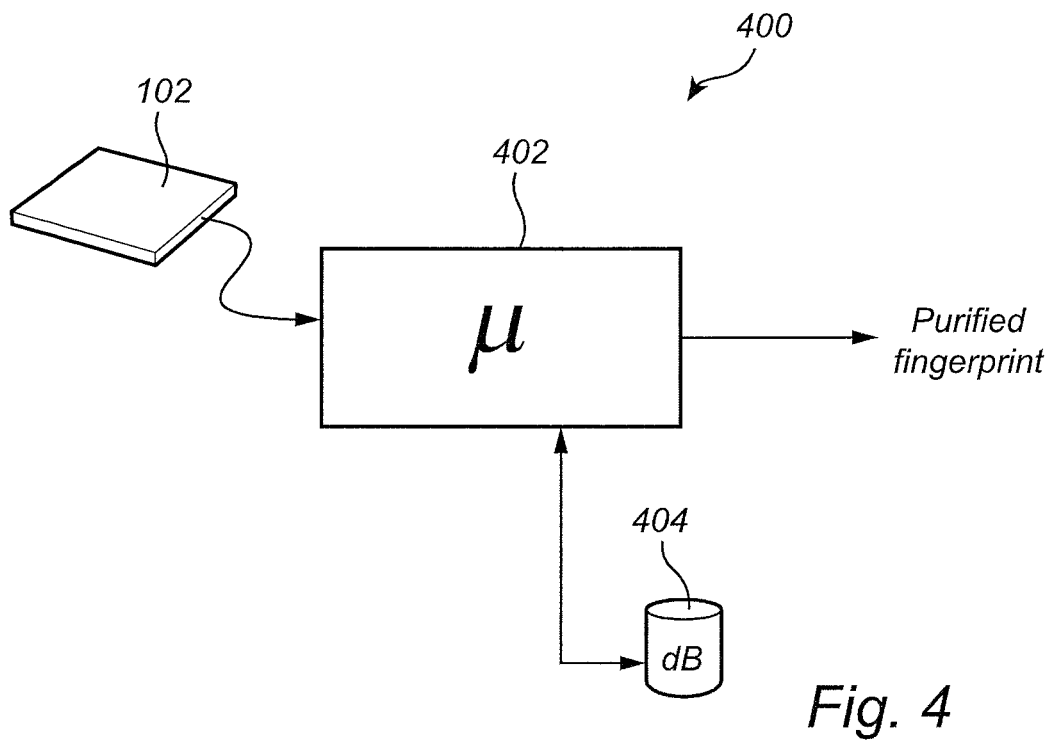
FIG. 4 conceptually illustrates a fingerprint sensing system according to a currently preferred embodiment of the invention.

In accordance with the invention, the fingerprint sensor 102 and the operation for acquiring a fingerprint image is achieved using a conceptualized fingerprint sensor system 400 as is illustrated in FIG. 4. The fingerprint sensor system 400 in turn, typically, forms part of the electronic device/mobile as is exemplified in FIG. 1.

The fingerprint sensor system 400 comprises the fingerprint sensor 102 and a processing circuitry, such as a control unit 402 for controlling the fingerprint sensor 102. The fingerprint sensor system 400 further comprises a memory, such as a database 404, e.g. storing a fingerprint template for the user. The control unit 402 may each include a microprocessor, microcontroller, programmable digital signal processor or another programmable device. The control unit 402 may also, or instead, each include an application specific integrated circuit, a programmable gate array or programmable array logic, a programmable logic device, or a digital signal processor. Where the control unit 402 includes a programmable device such as the microprocessor, microcontroller or programmable digital signal processor mentioned above, the processor may further include computer executable code that controls operation of the programmable device. It should be understood that all or some parts of the functionality provided by means of the control unit 402 (or generally discussed as "processing circuitry") may be at least partly integrated with the fingerprint sensor 402.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for analyzing biometric measurements of a user by means of a biometric sensing system comprising a biometric sensor and processing circuitry connected to the biometric sensor, wherein the method comprises the steps of:
determining a first set of features from a first biometric measurement of the user, the biometric measurement acquired using the biometric sensor, each feature of the first set of features having a location provided in relation to a reference coordinate system of the biometric sensor;
measuring alignment differences in the reference coordinate system between the locations of the first set of features and corresponding features of a second set of features from a second biometric measurement of the user; and
identifying a sub-set of the first set of features having an alignment difference being less than a threshold, wherein a measured alignment difference being less than the threshold is provided as an indication of a fixed pattern at or adjacent to a surface the biometric sensor.

2. The method according to claim 1, wherein each feature of the first set of features further has an orientation provided in relation to the biometric sensor.

3. The method according to claim 1, wherein the sub-set of the first set of features that is identified to have a measured alignment difference being less than the threshold is removed from the first set of features.

4. The method according to claim 1, wherein the measured alignment differences between the locations of the first set of features and corresponding features of the second set of features are tagged to the first set of features.

5. The method according to claim 1, further comprising updating the second set of features with a selection of features of the first set of features, not including the identified sub-set of the first set of features.

6. The method according to claim 1, further comprising authenticating the user by:
determining a matching level between the first set of features and the second set of features; and
comparing the matching level and a matching threshold, wherein the matching threshold is dependent on the measuring alignment differences.

7. The method according to claim 1, further comprising determining a summarized value for the measuring alignment differences.

8. The method according to claim 7, wherein the summarized value is a weighted summarized value.

9. The method according to claim 1, further comprising:
acquiring the second biometric measurement using the biometric sensor;
determining the second set of features from the second biometric measurement.

10. The method according to claim 9, wherein the second biometric measurement is acquired prior to acquiring the first biometric measurement.

11. The method according to claim 1, wherein the biometric sensing system is a vision system and the biometric sensor is a camera.

12. The method according to claim 1, wherein the biometric sensing system is a fingerprint sensing system and the biometric sensor is a fingerprint sensor.

13. The method according to claim 12, wherein the fingerprint sensor is configured to acquire a fingerprint image.

14. The method according to claim 12, further comprising forming a fingerprint measurement comprising a selection of features of the first set of features, not including the identified sub-set of features of the first set of features.

15. A fingerprint sensing system, comprising:
a fingerprint sensor;
a memory; and
processing circuitry connected to the fingerprint sensor for:
acquiring a first fingerprint image using the fingerprint sensor from a first biometric measurement of a user;
determining a first set of features from the first fingerprint image, each feature of the first set of features having a location provided in relation to a reference coordinate system of the fingerprint sensor;
measuring alignment differences in the reference coordinate system between the locations of the first set of features and corresponding features of a second set of features from a second biometric measurement of the user; and
identifying a sub-set of the first set of features having an alignment difference being less than a threshold, wherein a measured alignment difference being less than the threshold is provided as an indication of a fixed pattern at or adjacent to a surface the biometric sensor.

16. The fingerprint sensing system according to claim 15, wherein the fingerprint sensor is a capacitive fingerprint sensor.

17. An electronic device, comprising the fingerprint sensing system according to claim 15.

18. The electronic device according to claim 17, wherein the electronic device is a mobile phone.

19. A computer program product comprising a non-transitory computer readable medium having stored thereon computer program means for controlling an electronic device, the electronic device comprising a biometric sensing system comprising a biometric sensor and processing circuitry connected to the biometric sensor, wherein the computer program product comprises:
code for determining a first set of features from a first biometric measurement of a user, the biometric measurement acquired using the biometric sensor, each feature of the first set of features having a location provided in relation to a reference coordinate system of the biometric sensor;
code for measuring alignment differences in the reference coordinate system between the locations of the first set of features and corresponding features of a second set of features from a second biometric measurement of the user; and
code for identifying a sub-set of the first set of features having an alignment difference being less than a threshold, wherein a measured alignment difference being less than the threshold is provided as an indication of a fixed pattern at or adjacent to a surface the biometric sensor.

* * * * *